April 12, 1932.    G. G. BENNETT    1,853,253

HAY LOADING MACHINE

Filed Aug. 25, 1930

INVENTOR.
GRATTAN G. BENNETT
BY
ATTORNEY

Patented Apr. 12, 1932

1,853,253

UNITED STATES PATENT OFFICE

GRATTAN G. BENNETT, OF EL CENTRO, CALIFORNIA

HAY LOADING MACHINE

Application filed August 25, 1930. Serial No. 477,606.

My invention relates to agricultural implements.

An important object of the invention is in the provision of a device of the above named character which is adapted for picking up baled hay, straw, and the like and then elevating such materials to a platform from which manual transference is effected to a truck or similar conveying apparatus whereby said materials may be carted in quantity to a convenient place for storage.

Another object of the invention is the provision of a unique hay bale pick up device that does not jostle the bales to and fro before picking them up, but one which is positive and reliable.

Another object of the invention is the provision of an adjustable hay bale pick up arrangement.

Another object of the invention is the provision of an agricultural implement which is labor saving.

Still another object of the invention is the provision of an agricultural implement adapted for loading baled hay whereby a loose bale of hay may be picked up automatically and fed into an inclined chute or elevator, the elevator being provided with attachments for guiding the bale of hay up into the elevator, a floating bale sustaining frame or guard rack being provided to prevent retrograde movement of the bale while in the elevator.

Another object of the invention is the provision of a unique coupling means for the hay loader to connect it to its transporting means, whereby the said hay loader may be propelled in a superior manner.

Other and ancillary objects may also hereinafter appear.

The invention consists in the construction, combination, location, and relative arrangement of parts, all as will be more fully hereinafter set forth, as shown in the accompanying drawings, and finally pointed out in the claims.

Figure 1:
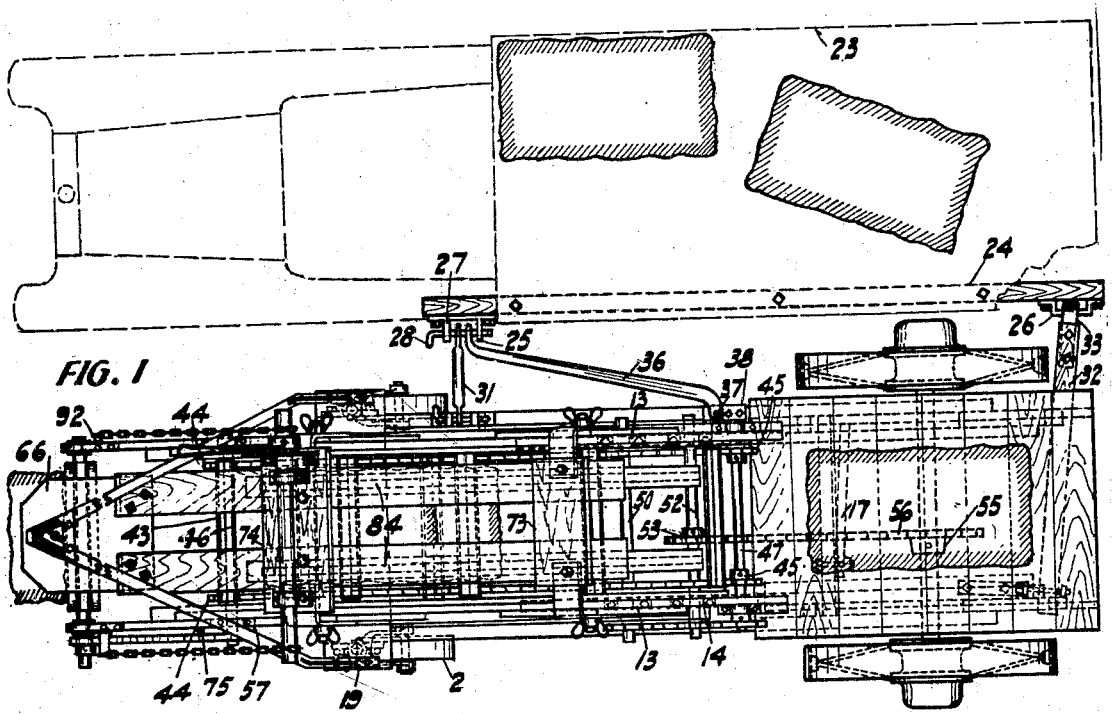
Fig. 1 is a plan view of a baled hay loader, attached to an auxiliary transporting mechanism, illustrating one embodiment of the invention.

The invention comprises a running gear 1, said running gear is provided with front castor wheels 2 and rear tractor wheels 3. The rear wheels and axle provide traction for the hay loader and motive power for operating the pick-up and elevating mechanism.

To the platform of the running gear is mounted the framework for supporting the elevating machinery and platform. The framework is composed of wooden beams, braces, and joists bolted together. A study of these parts may be had by referring to the several views of the drawings and since these parts only enter into the combination and are not necessarily new, and well understood, will only be inferentially alluded to in this application.

The side stringers 4 support the semi-vertical uprights 5, 6, 7, 8 and 9. Uprights 8 and 9 support the joists 10 to which is fastened the platform floor 11. The uprights 5, 6, and 7 support the elevating mechanism. To the uprights 6, 7, and 8, is bolted a transverse bearing supporting beam 12 which also serves as a brace to which is applied the two dolly boxes 13 and 14.

To the uprights 6, 7, 8 and 9 is bolted the transverse beam 15.

To the uprights 8 at about their half way point and disposed between the transverse beam 15 and the projecting end of the beam 12 is bolted a needle beam 16. There is also a diagonal brace 17 which is united to the needle beam 16, and the stringer 4 to rigidify the framing construction, just described.

When it is necessary to transport the hay loader from one place to another and as a means for attaching and detaching it to a tow car for the purpose of doing so in a more convenient manner, there is provided at the front end of the running gear a yoking attachment whereby the hay loader may be transported in tandem formation with reference to its tow means.

The yoke 18 is swingably supported in a pair of brackets 19 which are in turn carried by the bolster block 20 fastened to the stringer 4, and it may be swung into and out of use at will. Onto the yoke is provided a coupling attachment consisting of a clevis 21 and a clevis pin 22.

When the hay loader is being utilized for hay-loading purposes the hay loader must be free from encumbrances in front thereof, therefore it is necessary to provide for transporting means alongside or parallel with the hay loader itself.

Fig. 1 displays such a scheme. It will be observed in this figure that the truck or driving vehicle 23 not only serves as a propulsion means for the hay loader or driven vehicle, but provides a carrier for the baled hay as well.

The manner in which this truck is applied to the hay loader is shown in both Fig. 1 and Fig. 2, and will now be described.

Underneath the platform of the truck 23 is applied a wooden beam 24 and to the wooden beam is bolted brackets 25 and 26. The bracket 25 has a pair of flanges 27 and into said flanges is journalled a pin 28.

There is likewise bolted to the stringer 4 (Fig. 2) a similar bracket 29 in every respect to the bracket 25.

Connected to the pin 30 of the latter bracket 29 and the pin 28 of the former bracket 25 is a spacer rod 31 which definitely positions the hay loader with respect to the truck.

The spacer 31 is also designed with sufficient length as will conveniently enable a man standing on the truck to hook a bale of hay on the platform of the hay loader and manually transport it from the loader to the truck where it will be properly loaded for transportation.

There is an additional spacing means connecting the rear of the truck with the rear far side of the hay loader. It is a spacer beam 32. It is applied in a diagonal fashion, one end having an L bracket 33 bolted thereto which engages with the U bracket 26 fastened to the truck. The other end of the spacer beam is bolted to an angle clip 34, said angle clip being in turn bolted to the beam 35 fastened to the upright 7, 8 and 9.

To enable the hay loader to be transported in parallel fashion as shown in Fig. 1, there is provided a pull rod 36. One end of said pull rod is fastened to the pin 28 similar to the spacer rod 31.

The other end of said pull rod is swivelled to a pin 37 in a bracket plate 38, bolted to the stringer 4. The bracket plate 38 is placed about mid-way between the brackets 25 and 26, so as to distribute more evenly the stress entering into the running gear of the hay loader through the reaction brought about by the attaching means which connect the hay loader to the truck.

Figure 2:
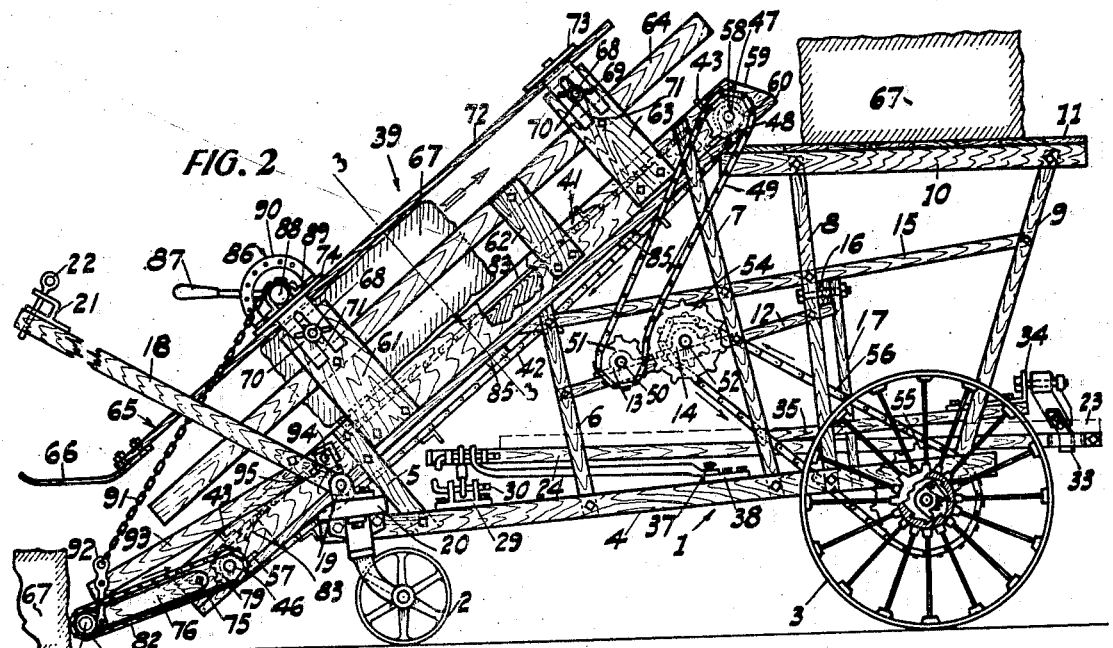
Fig. 2 is a side elevation of the hay loader.
Figures 3, 4:
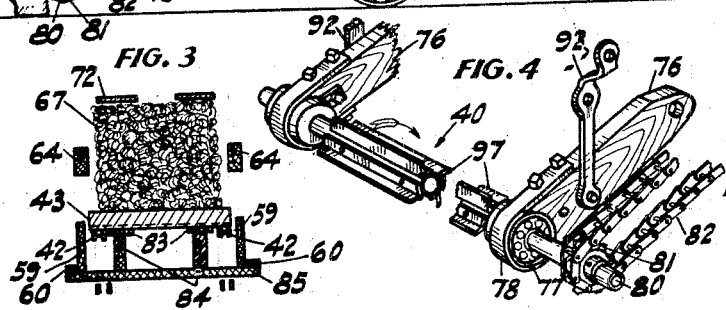
Fig. 3 is a section taken on the line 3—3 of Fig. 2.
Fig. 4 is a perspective view in part of the hay bale pick-up of the baled hay loader.

The hay bale pick-up and elevating mechanism which picks up the bale of hay and conveys it to the platform floor 11 will next be outlined with more particular reference to Figs. 2, 3 and 4.

The uprights 5, 6 and 7 support in inclined fashion an elevating mechanism 39 to which is applied for variable inclinations therewith a manually adjustable pick-up 40.

There is a hay bale conveyor 41, comprising a conveyor chain 42, and across the conveyor chains 42 is fastened angle irons 43, said angle irons spacing the chain and aiding in carrying the bale of hay up the incline. The chain 42 travels over sprockets 44 and 45, the sprockets 44 being mounted upon the shaft 46 and the sprockets 45 being mounted upon the shaft 47.

On the end of the near side of the shaft 47 is mounted another sprocket 48, said sprocket carries a sprocket chain 49. In the dolly boxes 13 is journalled a shaft 50 and onto said shaft at the near side is mounted a chain sprocket 51, said sprocket being in line with sprocket 48 and completes that part of the drive mechanism with which the drive chain 49 is associated.

In the dolly boxes 14 is journalled a shaft 52 and onto said shaft is mounted three sprockets, one, 53 disposed near the center of the hay loader as seen in Fig. 1, and two, 54 located at each end thereof.

The rear axle carries a sprocket drive wheel 55 and over said sprockets 55 and 53 travels a sprocket chain 56. The sprocket 55 drives the sprocket 53 thru the medium of the sprocket chain 56. The sprocket 53 thru the agency of its drive chain in turn rotates sprockets 54, said sprockets 54 also being adapted to have the sprocket chain 49 engage with the teeth thereof, thereby to drive said chain 49 on sprocket gears 48 and 51. Sprocket wheels 51, however, idle on shaft 50 while sprockets 48 being keyed to shaft 47 causes it to rotate, thereby rotating sprockets 45 to drive the conveyor chain 42 and the conveyor proper 41.

Aforesaid shafts 46 and 47 are journalled in dolly boxes 57 and 58, said dolly boxes being fastened within the angle formed by the union of the framing members 59 and 60, the framing member 59 being supported by the uprights 5 and 7 and the framing member 60 by the upright 6.

To the framing members 59 are also bolted upright members 61, 62 and 63. They each aid in supporting a guide plank 64 and members 61 and 63 further aid in supporting the floating guard rack 65.

The floating guard rack prevents the bale of hay from slipping down the conveyor incline, the bale of hay being of such depth that as the bale is fed into the conveyor chute by the pick-up 40 and the deflector plate 66, the guard rack will rest on the bale of hay 67 with sufficient pressure to prevent retrograde movement of the hay bale.

The uprights 61 and 63 are each provided with a guide bolt 68 and wing nut 69.

The guard rack 65 floatingly rests upon the hay bale 67 and the guide bolts 68, during its travel up the incline of the conveyor. The floating guide thus provided is therefore provided with guiding means at different points along its length which permit the chute located therebeneath to widen in a uniform manner throughout its length to accommodate bales of different sizes.

The guard rack 65 has a pair of longitudinal slats 72, to which at the front end thereof, the deflector plate 66 is bolted. The deflector plate also serves as a tie gusset at that point.

The slats 72 of the guard rack are also interconnected at points adjacent to the members 61 and 63.

At the rear end of the rack is a cross tie plate 73, and bolted thereto is an angle guide clip 70, one leg of which overlies in friction engagement with the outside face of the member 63 and is provided with a slot 71 therein, in which the guide bolt 68 plays and retains that end of the guard rack in proper relation to the elevating mechanism 39.

Disposed toward the front end of the guard rack at points adjacent the members 61 is a second cross tie plate 74, said cross tie plate is fastened to the slats 72 similarly to the way in which the cross tie plate 73 is fastened and it is also provided with a guide clip 70 one leg of which overlies in friction engagement with the outside face of the member 61 and is provided with a slot 71 therein in which the guide bolt 68 plays to retain the front end of the guard rack in proper relation to the elevating mechanism 39.

Pivotally connected to the front end of the framing member 59 by a pivot pin 75 is a pair of arms 76, said arms adjustably support the pick-up mechanism 40. There is grooved into the front end portions of said arms a ball race 77 and a strap iron 78 is bent around the exposed periphery of the ball race and bolted to said arms to sustain the pick-up arrangement in firm relation therewith.

Upon the ends of the shaft 46 which extend outwardly beyond the dolly boxes 57 are mounted the sprocket wheels 79, and upon the ends of the pipe shaft 80 which extends outwardly beyond the ball race bearings 77 are mounted the sprockets 81.

The sprocket chain 82 travels over the sprockets 79 and 81 to rotate the pipe shaft 80, said sprocket 81 and chain 82 being rotated about the shaft axis 46, similarly to the arms 76 about their pivot pin 75.

As the conveyor chain leaves the teeth of the sprocket 44 it is directed on to a metal wearing strip 83, said metal strip is carried by joists 84 which are in turn supported by a plurality of floor beams 85 fastened to the framing members 59 and 60.

The wearing strip 83 is for the angles 43 and the hay bale to slide upon, the weight of the hay bale being assumed by the joists 84 which is transferred to the framing members, said joists and wearing strip terminate adjacent to the platform 11 at a point where the hay bale leaves the conveyor.

The relation of the hay bale to the angles which transport the hay bale up the incline, the wearing strip, joists and their supporting members together with the framing members and the conveyor chain are all clearly shown in Fig. 3 which show a section of all the parts instrumental in the elevating of the hay bale while on the conveyor.

It is deemed expedient at times to vary the pitch of the pick-up 40 with relation to the elevating mechanism 39. To accomplish this I have inaugurated a manually operable means 86 which is adjustable from the drivers compartment of the truck 23.

It comprises a handle 87 fastened to a shaft 88 which is supported by bearings 89 fastened to the cross tie 74. The handle 87 is adjusted to various positions on the gage sector 90 and this manual manipulation causes the supporting chain 91, which is connected to the shaft 88 and to a link 92 fastened to the arm 76, to be wound about the shaft 88 to elevate the pick-up 40, and to be unwound therefrom to lower it.

To eliminate any side swishing of the pick-up, I have provided a diagonal brace or lever 93, one end of which is fastened to the link 92, the other end being fulcrumed to a fulcrum pin 94 journalled in the upstanding flange of a bracket 95 fastened to the framing member 59.

There is welded or riveted to the pipe shaft 80, angles 97; the outwardly directed flanges of which are disposed at right angles with one another, so that as the pipe shaft 80 is rotated and pressure is brought to bear, between the edges of the flanges and the bale of hay to be picked up, through the advance of the hay loader travelling in a direction toward the bale of hay. See Figs. 1 and 2, the hay bale will be gradually tilted until the top surface comes in contact with the deflector plate 66 when it will be directed into the conveyor chute and then elevated up the incline as described.

In the foregoing the operation of the device is completely set forth.

What is claimed is:—

1. The combination in a baled hay loader for a truck, of a transportable supporting frame, an elevating mechanism carried by said frame and operatively connected with the wheels thereof, a substantially horizontally disposed hay bale pick-up element including radial pick-up arms pivotally connected to and rotative thru the medium of said elevating mechanism, means cooperating with said pick-up element comprising a floating guard and a deflector plate carried by said guard whereby to form in conjunction with said elevating mechanism a chute, said deflector plate being adapted to engage the upper sides of a hay bale whereby to prevent the latter from tumbling after it has been engaged by said pick-up element and to direct it from said pick-up element into said chute and into said elevating mechanism, said floating guard cooperating with said elevating mechanism to prevent retrograde movement of the hay bale while being conveyed up the elevating mechanism, and means for maintaining the pick-up element in a position whereby to introduce a bale of hay into said elevating mechanism, said floating guard being provided with guiding means at different points along its length to permit said chute to widen in a uniform manner throughout its length to accommodate bales of different sizes.

2. In a machine of the class described, a hay bale pick-up mechanism including oppositely disposed radial pick-up arms, a hay bale receiving and elevating mechanism cooperating with said hay bale pick-up mechanism, a floating guard over said elevating mechanism to prevent retrograde movement of a hay bale while being conveyed up the elevating mechanism, said floating guard being provided with guiding means at different points along its length to permit said chute to widen in a uniform manner throughout its length to accommodate bales of different sizes, a deflector plate mounted to said floating guard and forming in conjunction with said pick-up mechanism a chute whereby to introduce a bale of hay to said elevating mechanism, a platform receiving floor for receiving the hay bale from said elevating mechanism; in combination with a truck for transporting said pick-up mechanism and said elevating mechanism whereto the hay bale is manually transferred from said platform.

3. In an apparatus of the character described, the combination with a driven vehicle and a platform carried thereby: of an elevator mounted on said driven vehicle adapted to elevate bales from the ground to said platform and consisting of an inclined conveyor having upper and lower sprocket wheels and shafting for said wheels and an inclined conveying connection which passes around said wheels, a rotary pick-up element having radially extending pick-up arms, a pair of arms having a pivotal mounting upon the lower shaft of said conveyor, said pair of arms supporting said pick-up device between their free ends, the axis of said rotary pick-up element and the pivotal axis from which it is swung being in the same plane, a driving chain for said pick-up device, said chain passing around and being driven by a wheel in axial alignment with said lower sprocket wheel, a floating guard disposed above said inclined conveyor to prevent retrograde movement of a hay bale while being conveyed to said platform, supporting means for said guard permitting all portions thereof to yield upwardly to substantially the same extent a deflector plate carried by said guard and disposed above said rotary pick-up element to form in conjunction therewith a chute whereby to introduce a hay bale on to said inclined conveyor, means to adjustably support said pick-up element at various levels, and means to operate said elevator and rotate said pick-up element.

4. In a loading machine, a driven vehicle adapted to be propelled by a driving vehicle, a rotatable transversely extending pick-up element carried by said driven vehicle, said pick-up element being provided with pick-up blades extending radially as to their width and transversely as to their length and being operatively connected with the wheels of said driven vehicle to be rotated by them in a direction to cause said arms to pick up hay bales or the like, an elevating device positioned to elevate bales thus picked up, and a guide adapted to form in conjunction with said pick-up element a chute whereby to engage the upper sides of said bales to direct them from said pick-up device on to said elevating device.

5. In a loading machine, a driven vehicle adapted to be propelled by a driving vehicle, a rotatable transversely extending pick-up element carried by said driven vehicle, said pick-up element being provided with pick-up blades extending radially as to their width and transversely as to their length and being operatively connected with the wheels of said driven vehicle to be rotated by them in a direction to cause said arms to pick up hay bales or the like, an elevating device positioned to elevate bales thus picked up, and a plate extending in a generally horizontal direction and adapted to form in conjunction with said pick-up element a chute whereby to engage the upper sides of said bales to direct them from said pick-up device on to said elevating device.

6. In a construction of the kind described, in combination, a frame, a pick-up device supported by said frame, an elevating mechanism mounted upon said frame, and a floating guard located above said elevating mechanism and adapted to cooperate therewith to form an inclined chute to convey upwardly bales lifted from the ground by said pick-up device, said floating guard having at its sides downwardly extending arms which cooperate with said frame to form guiding means to permit said floating guard to recede to substantially the same extent throughout all portions of its length to accommodate bales of different sizes.

7. In a construction of the kind described, in combination, a frame, a pick-up device supported by said frame, an elevating mechanism mounted upon said frame, and a floating guard located above said elevating mechanism and adapted to cooperate therewith to form an inclined chute to convey upwardly bales lifted from the ground by said pick-up device, said floating guard having at its sides downwardly extending slotted arms, and guide bolts carried by said frame and projecting loosely through the slots of said arms to permit said floating guard to recede to substantially the same extent throughout all portions of its length to accommodate bales of different sizes.

GRATTAN G. BENNETT.